United States Patent Office 2,838,402
Patented June 10, 1958

2,838,402
GELATIN DESSERT PRODUCT

Ernst Albert Steigmann, Stoneham, Mass., Matthew Hamell, Fort Lee, N. J., and Bernard Idson, Jamaica, N. Y., assignors to General Foods Corporation, New York, N. Y., a corporation of Delaware No Drawing. Application May 25, 1956
Serial No. 587,208

5 Claims. (Cl. 99—130)

This invention relates to a gelatin dessert product having improved gelling properties.

Various attempts have been made to shorten the time required for the preparation of gelatin jelly-like desserts and other food products employing edible gelatin gels. The period normally required to dissolve the gelatin and for an edible gel to form is in the order of several hours. The use of quantities of gelatin in excess of that required to achieve gelation of a dessert composition does decrease the time required for gelation; however in a matter of hours, the gel strength increases to an undesirable level and continues to increase, such that the texture of the dessert product eventually becomes tough and rubbery.

An object of this invention is to provide a gelatin dessert product which sets to a gel more rapidly than previous gelatin dessert products without developing a tough and rubbery texture.

Another object of this invention is to provide a gelatin dessert product which is substantially cold water soluble and will set to a gel rapidly without producing a dessert product having an undesirable tough and rubbery texture after standing overnight.

It has now been discovered that when a quantity of degraded gelatin, i. e., gelatin which has been degraded so that it has substantially no gelling power, is added to an aqueous solution containing gelatin of regular bloom, the time required for gelation of the gelatin dessert solution is decreased without an undesirable increase in the gel strength after standing overnight.

Although these improved results are obtained when the degraded gelatin is so-called zero bloom gelatin, the most improved results are obtained when degraded gelatin, having no gelling capacity at concentrations up to 25% and at temperatures down to 2° C. is employed. For convenience the latter type of gelatin is referred to in the specification and claims as gelatin having "zero gel strength." Advantageously this increase in rate of set without a loss in texture after long standing can be brought about at low pH's in the order of 3.2 to 3.8 resulting from use of various fruit flavor-enhancing acids such as citric, fumaric, adipic, tartaric and the like. However, similar improved results are obtained at more neutral pH's.

The degraded gelatin used in accordance with the present invention can be derived from any type of commercially prepared gelatin either alkalin or acid processed from cowhide, pigskin or ossein. Heat degraded and enzymatically degraded gelatin have both been effective in decreasing setting time while avoiding such an increase in gel strength as would give the product a tough and rubbery texture. It has been found that the quantity of enzymatically degraded gelatin required to produce an increase in the rate of gelation is much smaller than the quantity of heat degraded gelatin required to effect the same improvement and for this reason enzymatically degraded gelatin is prepared. Among the proteolytic enzymes which can be employed for this degradation are pepsin, trypsin, papain and several proteolytic enzymes of fungal origin.

The gelatin combination of this invention is effective in the acid system generally employed in gelatin desserts in which the tartness of a fruit flavor is desired. In preparing gelatin desserts, it is often desirable that sufficient acid be present to impart a tartness to the prepared dessert. Addition of adequate edible food acids such as citric, tartaric, fumaric, adipic and the like lowers the pH of the gelatin solution below its isoelectric point, and at this lower pH a number of hours of cooling temperature are required to gel the solution to a consistency desirable in these dessert products. The addition of buffer salts such as phosphates, bi-tartrates, and the like, designed to avoid excess reduction of the pH, has resulted in some improvement, but the setting time of such buffered gelatin desserts still ranges from 2–3 hours. The present combination of degraded and undegraded gelatin advantageously further decreases the setting time of gelatin desserts at the acid pH necessary to achieve adequate tartness. In this connection zero gel strength as well as zero bloom gelatin can be employed to advantage in various fruit-flavored gelatin products, such as gelatin-jelly desserts, chiffons, and salads.

In order to illustrate the improved results obtained by the present invention, the following examples are given:

Example 1

A 10% aqueous solution of 255 bloom neutral gelatin is refluxed for 87 hours to degrade the gelatin. After degradation the gelatin does not gel in 4 hours in aqueous solutions at concentrations up to 25% and at temperatures down to 2° C. This zero gel strength gelatin is added to an un-buffered gelatin dessert solution which in each case contains, in addition to various levels of non-degraded gelatin, 14.5 g. sucrose, 94 ml. water and sufficient citric acid to reduce the pH to 3.3. Each gelatin dessert solution is prepared by dissolving the gelatin in hot water (70° C.), after which the solution is cooled to 10° C. From that point the time to reach 10 bloom (an edible gel) is measured.

| Amount of Undegraded Gelatin | Heat Degraded Gelatin, g. | pH of the Mixture | Time to Reach 10 Bloom, min. | 18 hour Bloom |
|---|---|---|---|---|
| 1.5 g. 255 Bloom neutral gelatin | none | 3.3 | 110 | 16 |
| Do | 1.5 | 3.3 | 32 | 19.7 |
| Do | 3.0 | 3.3 | 32 | 18.4 |
| 1.65 g. 255 Bloom neutral gelatin | none | 3.3 | 60 | 24.2 |
| Do | 5 | 3.3 | 25 | 21.7 |
| Do | 10 | 3.3 | 20 | 19.1 |

Example 2

In a method for enzymatically degrading gelatin with papain for use in the present invention, a 10% aqueous solution of 10.7 gms. of neutral gelatin is prepared and adjusted to pH 6.0. To this solution is added 0.86 gms. of papain which had been previously activated with 0.86 gms. of cysteine hydrochloride for 10 minutes at 37° C. After 2 hours of degradation the gelatin solution is inactivated by the addition of 5 ml. of a 30% hydrogen peroxide solution, and the degraded gelatin solution is dried. To 1.6 gms. of the dried degraded gelatin powder is added 1.65 gms. 240 bloom neutral gelatin, 15.0 gms. sucrose, and 1.1 gms. citric acid. This dry mix is dissolved in 100 ml. warm water 40° C. and allowed to gel, the time required for gelation being measured as in Example 1 from the point at which the dessert mix was completely dissolved and cooled to 10° C. to the point at which a gel of edible consistency (10 bloom) is reached, This time was 20 minutes. After 18 hours the bloom of the gel was 29.0.

*Example 3*

Neutral gelatin is degraded enzymatically using various enzymes and conditions for degradation until each gelatin sample possesses no measurable standard bloom and has a viscosity below 10 millipoise at a 6% gelatin concentration at 60° C. These enzymatically degraded gelatin samples were non-gelling and were added to gelatin dessert formulations each of which contained, in addition to various levels of 240 bloom neutral gelatin, 15.0 gms. sucrose, and sufficient citric acid to bring the pH of the mixture to 3.3. Each formulation is dissolved in sufficient water to reach a volume of 100 ml. of solution. Using the enzymatically degraded gelatin samples in combination with varying weights of undegraded gelatin, the following results are obtained, the time to reach 10 bloom (an edible gel) being measured as in Example 1.

The phrase "regular bloom" as employed herein refers to nondegraded gelatin having substantial viscosity and gelling power and which usually has a bloom in the neighborhood of 250 but may range in bloom from 150 to as high as 265. Gelatins of such bloom are regularly employed in conventional gelatin dessert products and the improved results described herein stem from the use of such gelatins generally. Thus, gelatin having no gelling power is employable in accordance with this invention with gelatins having a bloom corresponding to that specified for and conventional in gelatin-containing food products generally.

The term bloom as used herein and in the appended claims is defined as the weight in grams required to impress a ½" diameter plunger 4 mm. into a gelatin solution containing 6% solids gelled at 10° C. for 17 hours. A suitable test procedure for determining bloom is outlined in Industrial and Engineering Chemistry, Analytical Editions, volume II, page 348 and volume XVII, page 64.

| Amount of Undegraded Gelatin | Enzymatically Degraded Gelatin | | | pH of mixture | Time to reach 10 Bloom, min. | 18 hr. Bloom |
|---|---|---|---|---|---|---|
| | Enzyme | Viscosity | Amount Used, g. | | | |
| 1.28 g | | | none | 3.3 | 100 | 16.2 |
| 1.28 g | Papain, 2 hrs | 8.4 M. P | 8.1 | 3.3 | 40 | 20.5 |
| 1.95 g | | | none | 3.3 | 17 | 27 |
| 1.95 g | Rohm & Haas P-11 enzyme, 2 hrs. | 6.3 | 5 | 3.3 | 11 | 21 |

*Example 4*

Pig gelatin which was heat degraded to zero bloom also gives a desirable decrease in setting time as illustrated in the following table of data. 94 ml. of each gelatin solution contained 1.5 gms. of 255 bloom neutral gelatin, 14.5 gms. sucrose, and sufficient citric acid to adjust the solution to pH 3.3. The time to reach 10 bloom and the 18 hour bloom were measured as in Examples 1–3.

| Gelatin dessert sample | Zero Bloom Gelatin (gms.) | Time to reach 10 Bloom (min.) | 18 hr. Bloom |
|---|---|---|---|
| 1 | none | 110 | 16 |
| 2 | 0.6 | 56 | 21.5 |
| 3 | 1.5 | 32 | 23.5 |

As will be noted by comparison with Example 1 the 18 hour bloom was higher in cases where zero bloom gelatin rather than zero gel strength gelatin was added to the solutions. Also the time required to reach 10 bloom was shorter in cases where zero gel strength gelatin was employed; but both zero bloom and zero gel strength gelatin significantly reduced the time for the solution containing 255 bloom gelatin to set without causing an undesirable final bloom, although zero bloom samples were less preferred in this connection.

It will be understood that while the invention has been described in part by means of specific examples reference should be had to the appended claims for a definition of the scope of the invention.

What is claimed is:

1. An improved gelatin dessert product containing gelatin of regular bloom and gelatin which has been degraded so that it has substantially no gelling power.

2. An improved gelatin dessert product containing gelatin of regular bloom and gelatin which has been degraded so that it has zero bloom.

3. An improved gelatin dessert product containing gelatin of regular bloom and gelatin which has been degraded so that it has a zero gel strength.

4. An improved gelatin dessert product containing gelatin of regular bloom and gelatin which has been enzymatically degraded to a point at which it has no gelling power.

5. An improved gelatin dessert product containing gelatin of regular bloom and gelatin which has been enzymatically degraded to a point at which it has zero gel strength.

References Cited in the file of this patent

UNITED STATES PATENTS

| 2,338,415 | Downey et al. | Jan. 4, 1944 |
| 2,368,393 | Zeigler | Jan. 30, 1945 |
| 2,519,961 | Grettie | Aug. 22, 1950 |
| 2,557,871 | Harnack et al. | June 19, 1951 |